United States Patent
Menzies et al.

(10) Patent No.: US 10,559,933 B1
(45) Date of Patent: Feb. 11, 2020

(54) MANUAL DISCONNECT WITH CONNECTOR POSITION ASSURANCE ASSEMBLY

(71) Applicant: Lear Corporation, Southfield, MI (US)

(72) Inventors: David Menzies, Linden, MI (US); Reinhard Pusch, Farmington Hills, MI (US); Anthony Butcher, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/229,348

(22) Filed: Dec. 21, 2018

(51) Int. Cl.
*H01H 85/22* (2006.01)
*H01H 85/54* (2006.01)
*H01R 33/95* (2006.01)
*H01H 85/20* (2006.01)

(52) U.S. Cl.
CPC ......... *H01R 33/95* (2013.01); *H01H 85/2015* (2013.01); *H01H 85/22* (2013.01); *H01H 85/54* (2013.01)

(58) Field of Classification Search
CPC .... H01R 33/95; H01H 85/2015; H01H 85/22; H01H 85/54
USPC .......................................................... 337/227
See application file for complete search history.

(56) References Cited

U.S. PATENT DOCUMENTS

| | | | |
|---|---|---|---|
| 5,572,396 A * | 11/1996 | Robinson | G01R 1/36 361/117 |
| 6,456,187 B2 * | 9/2002 | Konda | H01H 1/365 337/186 |
| 7,244,148 B2 * | 7/2007 | Maguire | B60L 3/0069 439/620.28 |
| 7,474,194 B2 * | 1/2009 | Darr | H01H 9/104 337/59 |
| 7,658,653 B2 * | 2/2010 | Diekmann | H01H 85/2045 439/715 |
| 7,893,809 B2 * | 2/2011 | Head | H01H 85/54 337/194 |
| 8,098,126 B2 | 1/2012 | Niedzwiecki et al. | |
| 8,562,368 B2 | 10/2013 | Boyer | |
| 8,968,021 B1 * | 3/2015 | Kennedy | H01R 13/6273 439/352 |
| 9,231,359 B1 | 1/2016 | Butcher et al. | |
| 9,397,459 B2 | 7/2016 | Butcher et al. | |
| 2017/0330718 A1 * | 11/2017 | Funcheon | H01H 83/10 |

* cited by examiner

*Primary Examiner* — Anatoly Vortman
(74) *Attorney, Agent, or Firm* — MacMillan, Sobanski & Todd, LLC (57) ABSTRACT

A manual disconnect for an electric circuit includes a base with primary terminals and an interlock connector. A plug assembly has fuse terminals and an interlock resistor assembly. The plug assembly is adapted to be moved relative to the base between a disconnected position, a primary circuit engaged position, and an interlock position. The plug assembly is moved linearly and rotationally relative to the base when moving between these positions. The manual disconnect also includes a connector position assurance assembly. The connector position assurance assembly includes a connector position assurance button that is movable relative to the plug assembly. The connector position assurance button can be moved between a pre-lock position and an assurance position. When located in the assurance position, the connector position assurance assembly prevents the plug assembly from rotating relative to the base.

20 Claims, 8 Drawing Sheets

MANUAL DISCONNECT WITH CONNECTOR POSITION ASSURANCE ASSEMBLY

BACKGROUND OF THE INVENTION

This invention relates to a connector position assurance assembly for a manual disconnect. More specifically, this invention relates to a connector position assurance assembly for a manual disconnect that includes a rotatable feature.

A manual disconnect is typically used on machines such as electric vehicles that include high voltage batteries. The manual disconnect allows a technician to disconnect the high voltage circuits on the vehicle at the battery prior to doing any work on the high voltage components. This helps reduce the risk of electric shock. Examples of a manual disconnect are described in U.S. Pat. Nos. 9,231,359 and 9,397,459.

The manual disconnect described in U.S. Pat. No. 9,397,459 includes a plug assembly with a plug housing and a handle. The plug assembly is mated with a base by pushing the plug assembly into a space on the base. This allows the plug assembly to close a primary high voltage circuit. The handle is then rotated relative to the plug housing, and the plug assembly is then pushed farther into the base. This allows the plug assembly to close a secondary interlock circuit. When the interlock circuit is closed, a controller will allow current flow through the primary circuit. The handle is then rotated relative to the plug housing to a final position.

When the manual disconnect is removed from the base this process is reversed. The handle is first rotated away from the final position. The plug assembly next is pulled away from the base, which opens the interlock circuit. When the interlock circuit is opened, the controller disables current flow through the primary circuit. The handle is again rotated relative to the plug housing. The plug assembly is then pulled farther from the base which opens the primary circuit. It would be advantageous to have an alternative manual disconnect that can be used in addition to the known manual disconnect.

SUMMARY OF THE INVENTION

This invention relates to a manual disconnect for an electric circuit. The manual disconnect includes a base. The base has primary terminals and an interlock connector. The manual disconnect also includes a plug assembly. The plug assembly has fuse terminals and an interlock resistor assembly. The plug assembly is adapted to be moved relative to the base between multiple positions. The plug assembly can be in a disconnected position, wherein the fuse terminals are not engaged with respective primary terminals. The plug assembly can be in a primary circuit engaged position, wherein the fuse terminals are engaged with respective primary terminals. Additionally, the plug assembly can be in an interlock position, wherein the interlock connector is engaged with the interlock resistor assembly. The plug assembly is moved in an insertion direction relative to the base to move the plug assembly from the disconnected position to the primary circuit engaged position. The plug assembly is rotated about an axis relative to the base to move the plug assembly from the primary circuit engaged position to the interlock position. The manual disconnect also includes a connector position assurance assembly. The connector position assurance assembly includes a connector position assurance button that is movable relative to the plug assembly. The connector position assurance button can be moved between a pre-lock position and an assurance position. When the connector position assurance button is in the assurance position, the connector position assurance assembly prevents the plug assembly from rotating relative to the base.

This invention also relates to a manual disconnect for an electric circuit wherein the plug assembly includes a plug housing and a handle. The plug housing includes fuse terminals and an interlock resistor assembly. The handle is attached to the plug housing for relative rotational movement. The plug assembly is moved in an insertion direction relative to the base to move the plug assembly from the disconnected position to the primary circuit engaged position. The handle is rotated about an axis that is parallel to the insertion direction relative to the base to move the plug assembly from the primary circuit engaged position to the interlock position.

This invention also relates to a manual disconnect for an electric circuit including a plug assembly. The plug assembly has a plug housing with fuse terminals and an interlock resistor assembly. The plug assembly also has a handle attached to the plug housing for relative rotational movement between an initial position and a locked position. The plug assembly has a connector position assurance button attached to the handle for relative movement from a pre-lock position in an assurance direction to an assurance position. The connector position assurance button engages the plug housing to prevent movement to the assurance position when the handle is in the initial position.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
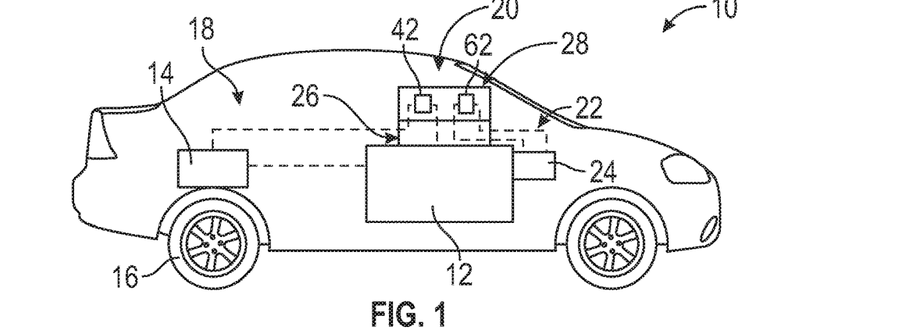
FIG. 1 is a schematic view of an electric vehicle including a manual disconnect.

Referring now to the drawings, there is illustrated in FIG. 1 a schematic view of an electric vehicle, indicated generally at 10. The electric vehicle 10 includes a battery 12. The illustrated vehicle 10 is an electric vehicle, but may be a hybrid vehicle or any desired type of vehicle that includes a battery 12. The electric vehicle 10 includes an electric motor 14 that is connected to drive wheels 16. A primary circuit, indicated at 18, provides current flow from the battery 12 through the electric motor 14. The illustrated electric motor 14 is one type of electric equipment that may be connected to the battery 12, and it should be appreciated that any desired electric equipment may be powered by the battery 12 through the primary circuit 18.

The electric vehicle 10 includes a manual disconnect, indicated generally at 20. The manual disconnect 20 allows a technician to open the primary circuit 18 at the battery 12. This could be done, for example, when the electric motor 14 is to be serviced. The illustrated manual disconnect 20 is a manual service disconnect. However, the manual disconnect 20 may be used for any desired circuit disconnection. It should be appreciated that the primary circuit 18 is only described in a simplified form sufficient for the understanding of the manual disconnect 20. The preferred embodiment of the invention will be described in connection with the battery 12 on the electric vehicle 10, but it should be appreciated that the invention may be used as an electric disconnect in any desired circuit.

The illustrated manual disconnect 20 is also part of an interlock loop, indicated generally at 22. The interlock loop 22 is monitored by a battery control 24. When the interlock loop 22 is open, the battery control 24 disables current flow through the primary circuit 18. When the interlock loop 22 is closed, the battery control 24 permits current flow through the primary circuit 18.

Figure 2:
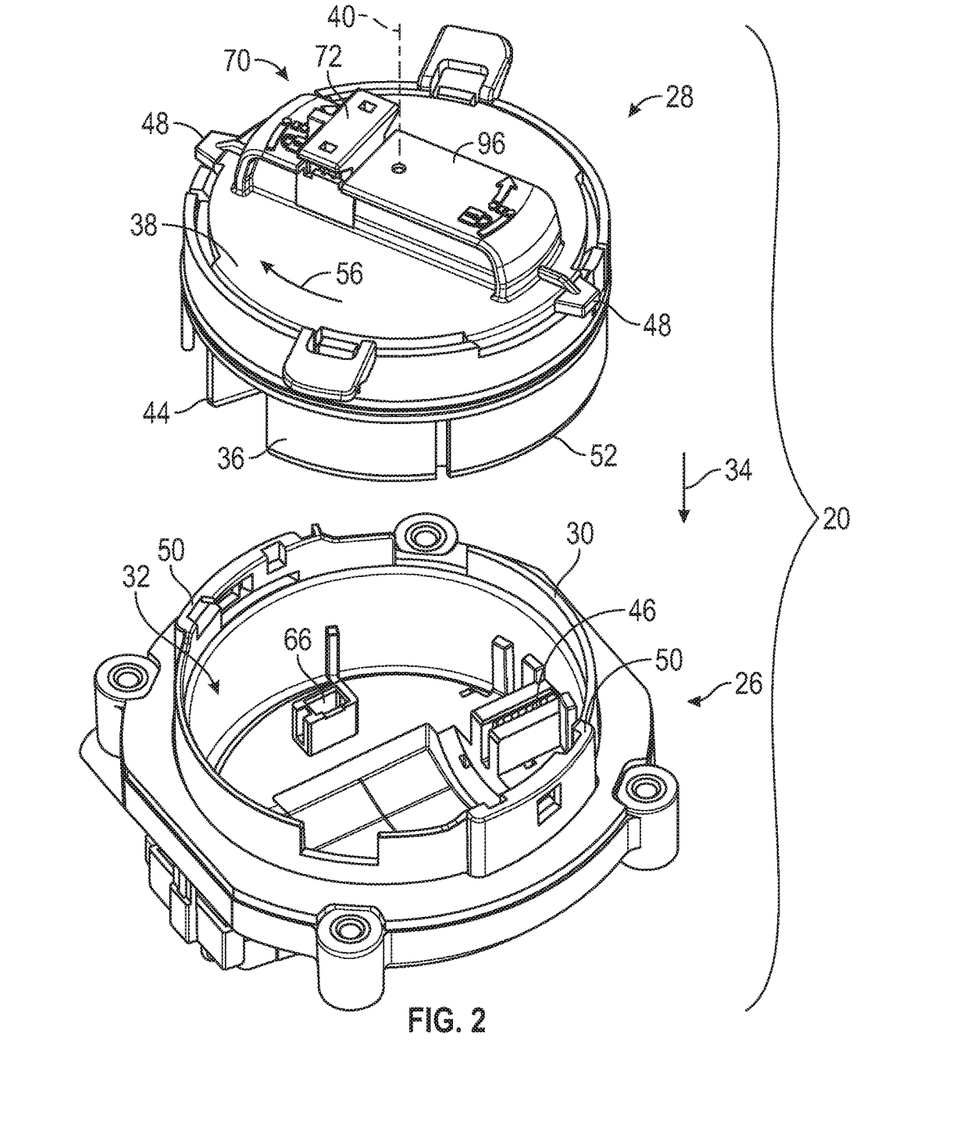
FIG. 2 is a perspective view of the manual disconnect showing a plug assembly separate from a base.

Referring to FIG. 2, there is illustrated a perspective view of the manual disconnect 20 shown in a disconnected position. The manual disconnect 20 includes a base, indicated generally at 26, and a plug assembly, indicated generally at 28. The base 26 includes a base side wall 30 that defines a base space, indicated generally at 32. The illustrated side wall 30 is circular and defines a substantially puck-shaped base space 32. To mate the plug assembly 28 with the base 26, the plug assembly 28 is moved in an insertion direction 34 into the base space 32. The manual disconnect 20 includes several features similar to the manual disconnect described in U.S. Pat. No. 9,397,459, the disclosure of which is hereby incorporated by reference in its entirety.

Figure 3:
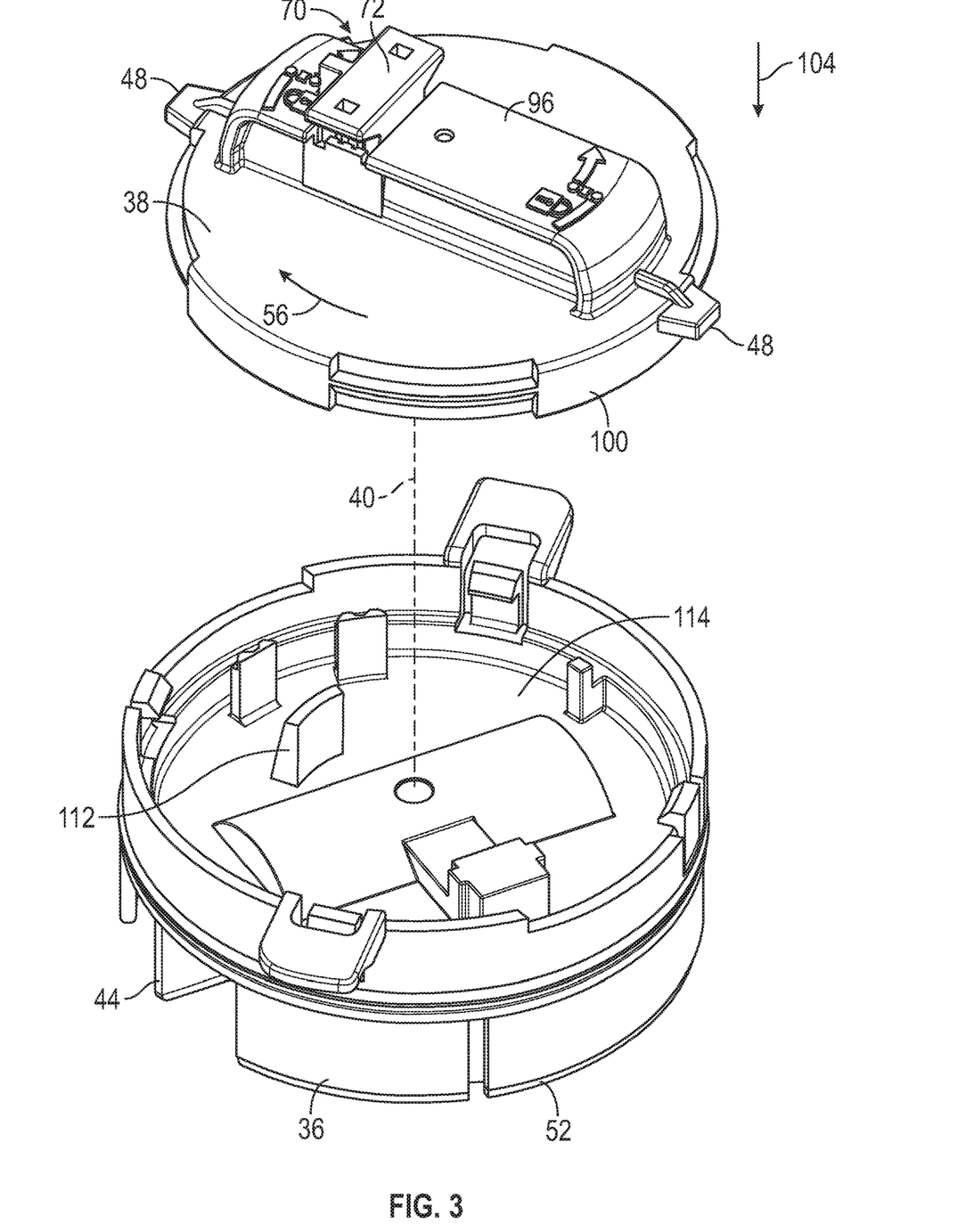
FIG. 3 is an exploded perspective view of the plug assembly showing a handle separate from a plug housing.

Referring to FIG. 3, there is illustrated a perspective view of the plug assembly 28 with a plug housing 36 and a handle 38 shown separate from each other. The handle 38 attaches to the plug housing 36 for relative rotational movement about a rotation axis 40, similar to the plug assembly described in the '459 patent.

Figure 4:
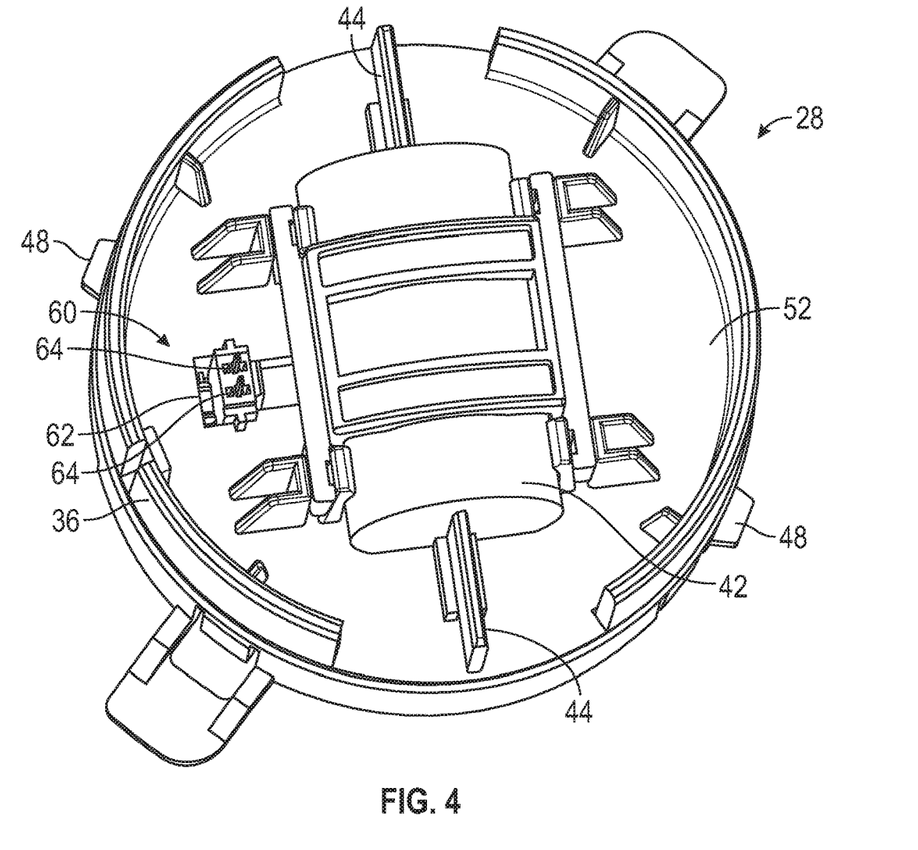
FIG. 4 is a perspective view of the bottom of the plug assembly.

Referring to FIG. 4, a view of the plug assembly 28 is shown from below. The plug assembly 28 includes a fuse 42 with two fuse terminals 44. When the plug assembly 28 is inserted into the base space 32, each fuse terminal 44 engages a primary terminal 46 located in the base space 32 (one primary terminal 46 is visible in FIG. 2). The plug assembly includes two lock tabs 48 that extend from the handle 38. The base 26 includes two lock channels 50 defined in the base side wall 30. When the plug assembly 28 is inserted into the base space 32, each lock tab 48 is positioned in one of the lock channels 50.

Figure 5:
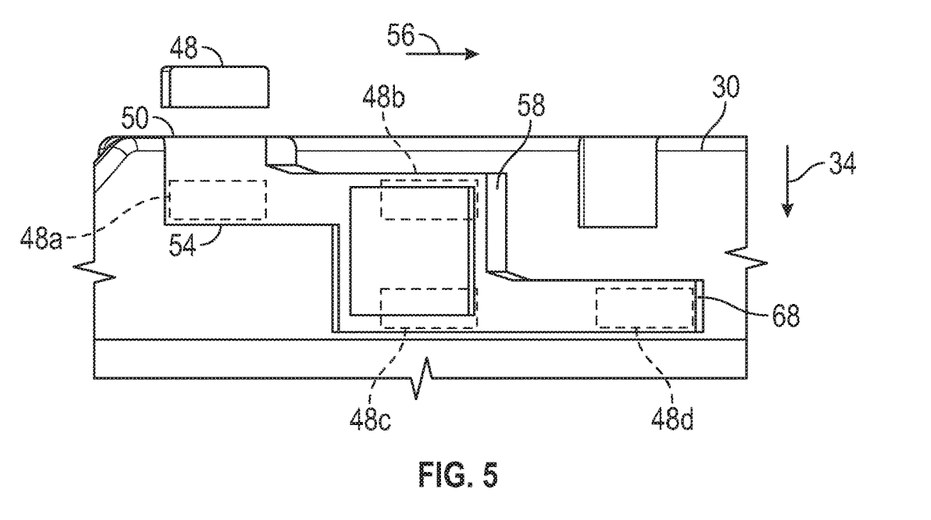
FIG. 5 is an enlarged detail view of a portion of the base showing a lock channel and the relative positions of a lock tab on the plug assembly during various stages of connecting the plug assembly to the base.

Referring to FIG. 5, there is illustrated a detail view of a portion of the base side wall 30 showing one of the lock channels 50. Also, the relative location of one lock tab 48 is shown in various positions as will be described below. Although only one lock channel 50 and one lock tab 48 is shown in FIG. 5, the other lock tab 48 will be in similar positions relative to the other lock channel 50.

To mate the plug assembly 28 with the base 26, the plug assembly 28 is initially positioned with an assembly insertion side 52 facing the base 26. The fuse 42 is located on the assembly insertion side 52 of the plug assembly 28. The plug assembly 28 is then moved in the insertion direction 34 relative to the base 26 so that the assembly insertion side 52 enters the base space 32. The plug assembly 28 is oriented so that each of the fuse terminals 44 mates with one of the primary terminals 46, and each of the lock tabs 48 enters one of the lock channels 50. The lock tabs 48 move to a position 48a (shown on FIG. 5) and are adapted to engage a channel wall 54 to prevent further movement of the plug assembly 28 in the insertion direction 34. At this point, the plug assembly 28 is located in a primary circuit engaged position, and the primary circuit 18 is closed.

When the plug assembly 28 is in the primary circuit engaged position, the handle 38 is adapted to be rotated relative to the plug housing 36 and relative to the base 26 about the rotation axis 40 in a locking direction 56 (shown in FIGS. 2, 3, and 5). In the illustrated embodiment, the rotation axis 40 is parallel to the insertion direction 34. However, the rotation axis 40 may have any desired orientation. Referring back to FIG. 5, when the handle 38 is rotated in the locking direction 56, the lock tabs 48 move from the position 48a to a position 48b, where they engage a channel wall 58 to prevent further movement of the handle 38 in the locking direction 56. The plug assembly 28 is then located in an intermediate position relative to the base 26.

Next, the plug assembly 28 is adapted to be moved farther in the insertion direction 34 from the intermediate position. The lock tabs 48 thus are moved from the position 48b in the insertion direction 34 to a position 48c. Referring back to FIG. 4, the plug assembly 28 includes an interlock resistor assembly 60 that includes an interlock resistor 62 connected to two resistor terminals 64. Referring to FIG. 2, the base includes an interlock connector 66 located in the base space 32. When the lock tabs 48 are moved to the position 48c, the interlock resistor assembly 60 enters the interlock connector 66 so that the resistor terminals 64 engage complementary terminals (not shown) to close the interlock loop 22. At this point, the plug assembly 28 is located in an interlock position relative to the base 26, and both the primary circuit 18 and the interlock loop 22 are closed.

When the plug assembly 28 is in the interlock position, the handle 38 is adapted to be rotated relative to the plug housing 36 and relative to the base 26 about the rotation axis 40 in the locking direction 56. Referring back to FIG. 5, when the handle 38 is rotated in the locking direction 56 the lock tabs 48 move from the position 48c to a position 48d, where they engage a channel wall 68 to prevent further movement of the handle 38 in the locking direction 56. The plug assembly 28 is then located in a locked position relative to the base 26. When the plug assembly 28 is in the locked position, both the primary circuit 18 and the interlock loop 22 are closed, similar to the manual disconnect described in the '459 patent.

Referring back to FIG. 2, the illustrated manual disconnect 20 also includes a connector position assurance assembly, indicated generally at 70. The connector position assurance assembly 70 includes a connector position assurance button 72 that is attached to the handle 38 for movement therewith. The connector position assurance assembly 70 is shown in a pre-lock position in FIG. 2 and is adapted to remain in the pre-lock position until the plug assembly 28 is located in the locked position.

Figures 6, 7:
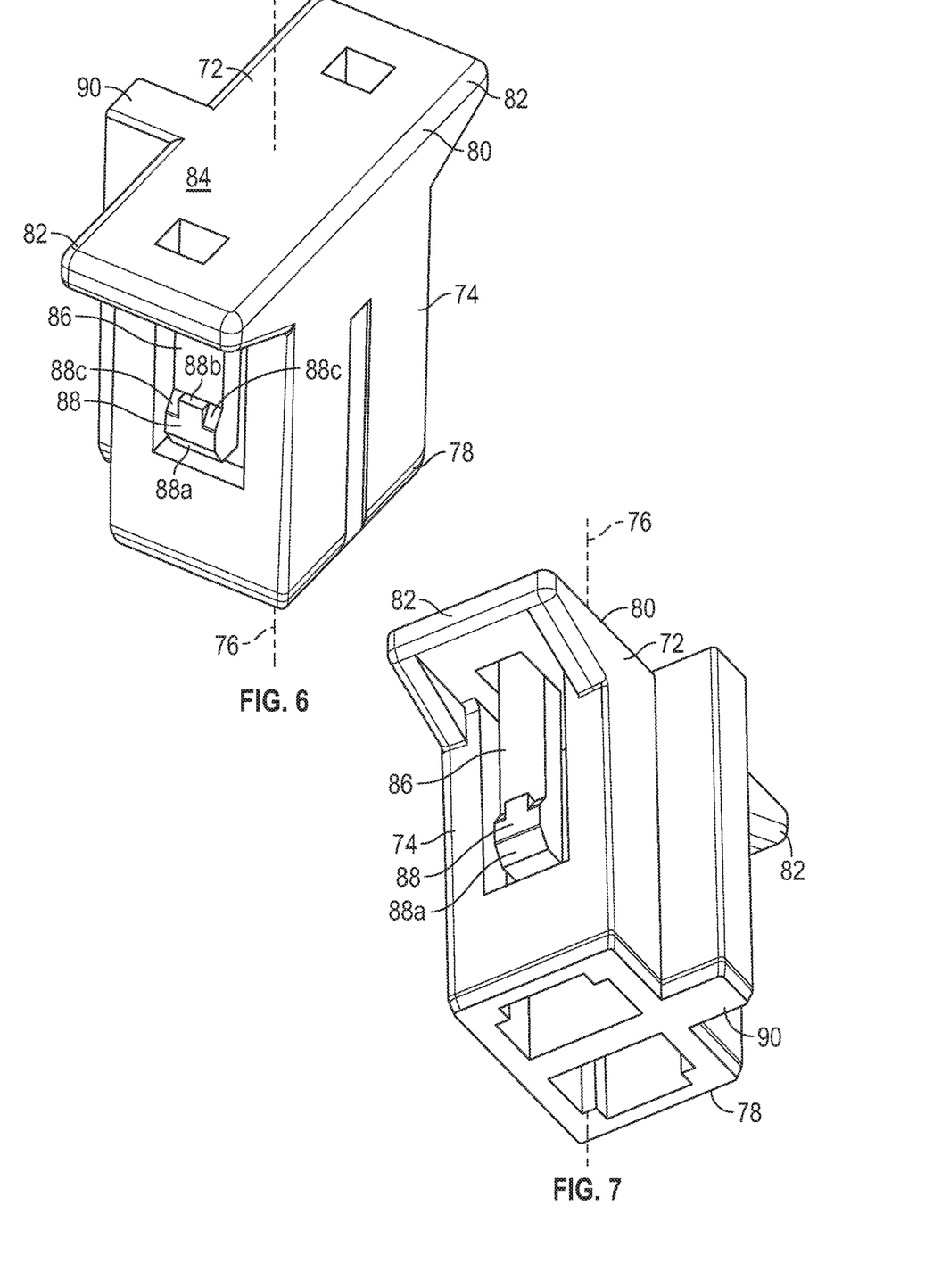
FIG. 6 is a perspective view of a connector position assurance button separate from the handle of the plug assembly.
FIG. 7 is a perspective view of the connector position assurance button from behind and below.

Referring to FIG. 6, there is a shown an enlarged, perspective view of the connector position assurance button 72. FIG. 7 shows a perspective view of the connector position assurance button 72 taken from behind and below. The illustrated connector position assurance button 72 is molded from plastic, but may be made of any desired material and by any desired process. The connector position assurance button 72 includes a button body 74 that extends along a button axis 76 from an insertion end 78 to an engagement end 80. Two wings 82 extend from opposed sides of the button body 74 at the engagement end 80 and define a press surface 84. The press surface 84 is provided to allow an operator to apply a force to the connector position assurance button 72, as will be described below.

The connector position assurance button 72 includes two lock arms 86 located on opposed sides of the button body 74. The illustrated lock arms 86 are located on the same sides of the button body 74 as the wings 82, but may be located on any desired part of the connector position assurance button 72. The lock arms 86 are attached to the button body 74 near the engagement end 80 and extend parallel to the button axis 76 toward the insertion end 78. The lock arms 86 are resilient and are adapted to move relative to the button body 74. Each lock arm 86 includes a lock head 88 on an outer end thereof.

The connector position assurance button 72 also includes a button stop 90 that extends from the button body 74. The illustrated button stop 90 extends from a different side of the button body 74 than the wings 82, but may be located on any desired part of the connector position assurance button 72. The illustrated button stop 90 has a generally rectangular cross-section taken perpendicular to the button axis 76 and extends from the insertion end 78 to the engagement end 80, but may have any desired shape and size.

Figure 8:
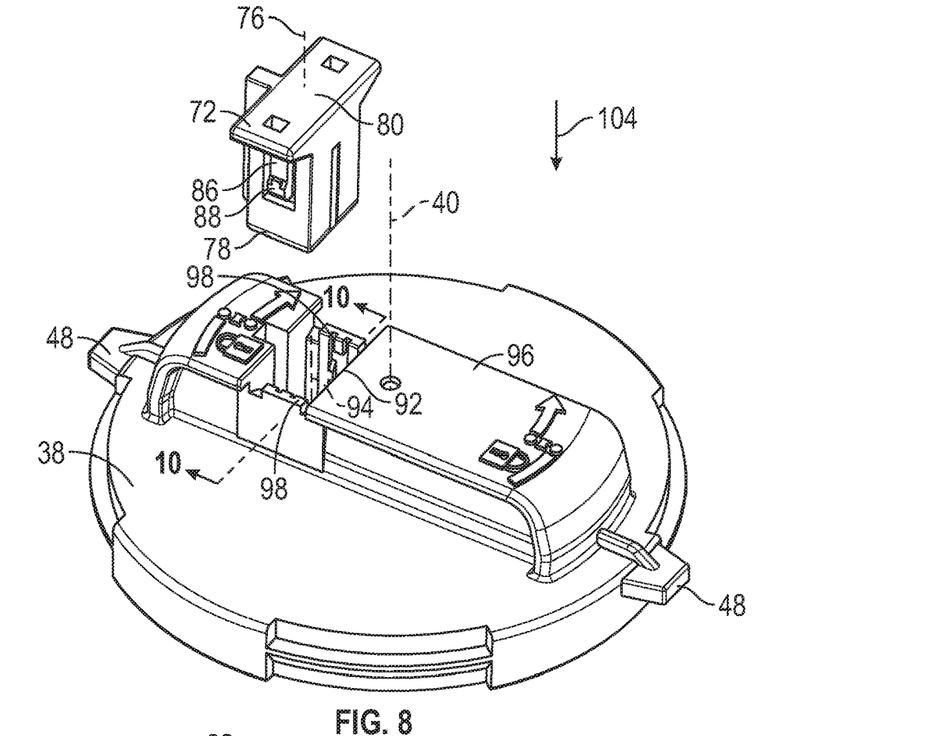
FIG. 8 is an exploded perspective view of the handle and the connector position assurance button shown separated.

Referring to FIG. 8, there is illustrated a perspective view of the handle 38 and the connector position assurance button 72 separate from each other. The handle 38 includes a connector position assurance slot 92 that extends along a slot axis 94 from a first handle side 96 of the handle 38. In the illustrated embodiment, the slot axis 94 is parallel to the insertion direction 34, but the slot axis 94 may have any desired orientation. In the illustrated embodiment, the first handle side 96 of the handle 38 is the side that is oriented away from the plug housing 36 when the plug assembly 28 is assembled, but may be any desired side of the handle 38.

The connector position assurance slot 92 includes two lock surfaces 98 that are located on opposed sides of the slot axis 94. The lock surfaces 98 include features that cooperate with the lock heads 88 on the connector position assurance button 72 in order to retain the connector position assurance button 72 in a plurality of positions relative to the handle 38, as will be described below. Although the illustrated lock surfaces 98 are located on opposed sides of the connector position assurance slot 92, the lock surfaces 98 may be on any desired part of the connector position assurance slot 92. In the illustrated embodiment, the two lock surface 98 are mirror images of each other, and only one lock surface 98 will be described in detail. However, the lock surfaces 98 may have different features, if desired.

Figure 9:
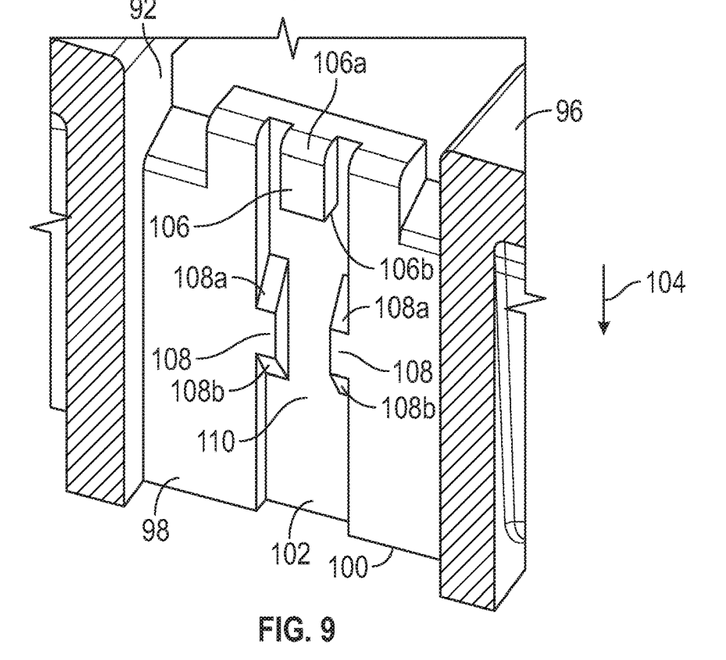
FIG. 9 is an enlarged detail view of a portion of the handle showing a lock surface of a connector position assurance slot.

Referring to FIG. 9, there is illustrated an enlarged view of a portion of the connector position assurance slot 92 and one of the lock surfaces 98. The connector position assurance slot 92 extends from the first handle side 96 to a second handle side 100 of the handle 38. In the illustrated embodiment, the second handle side 100 is the side of the handle 38 that faces the plug housing 36 when the plug assembly 28 is assembled. The lock surface 98 includes a head groove 102 that extends parallel to the slot axis 94. The head groove 102 is located where one of the lock heads 88 engages the handle 38, as will be described below.

Figure 10:
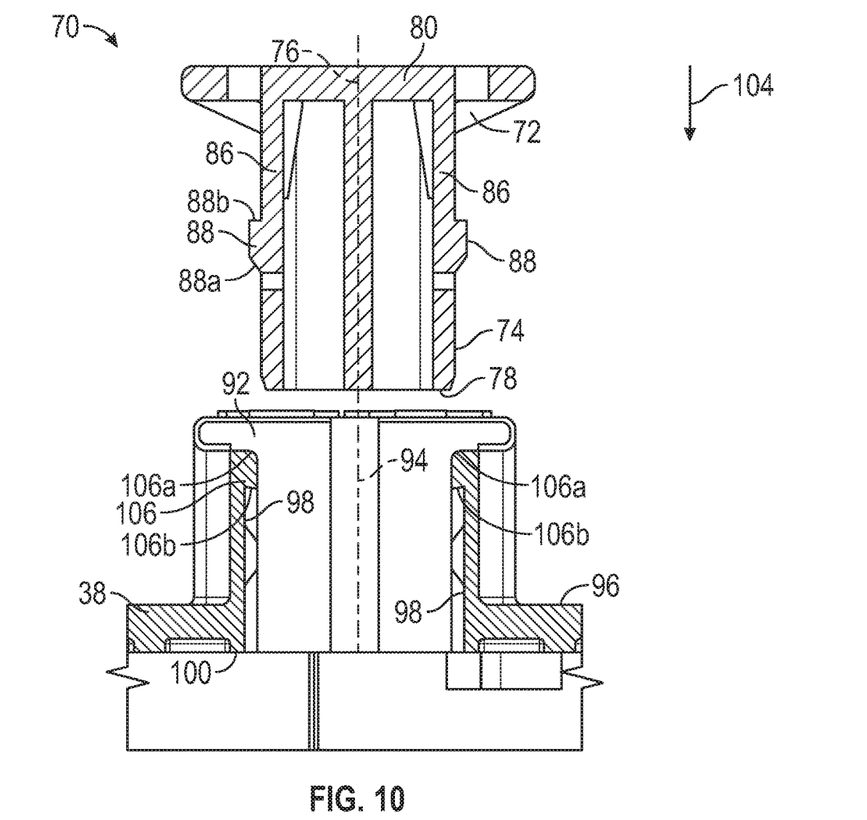
FIG. 10 is a cross-sectional view taken along the line 10-10 of FIG. 8 showing the connector position assurance button separate from the handle.

As shown in FIG. 8, to attach the connector position assurance button 72 to the handle 38, the connector position assurance button 72 is initially positioned with the insertion end 78 facing the first handle side 96 of the handle 38 and with the button axis 76 aligned with the slot axis 94. A cross-sectional view taken along the line 10-10 of FIG. 8 is illustrated in FIG. 10. The view illustrated in FIG. 10 is taken through the two lock arms 86 and through the two lock surfaces 98. From the initial position, the connector position assurance button 72 is moved relative to the handle 38 in an assurance direction 104 that is parallel to the slot axis 94. As previously described, the slot axis 94 is parallel to the insertion direction 34 and, therefore, the assurance direction 104 is also parallel to the insertion direction 34. However, the assurance direction 104 may have any desired orientation relative to the insertion direction 34.

Figure 11:
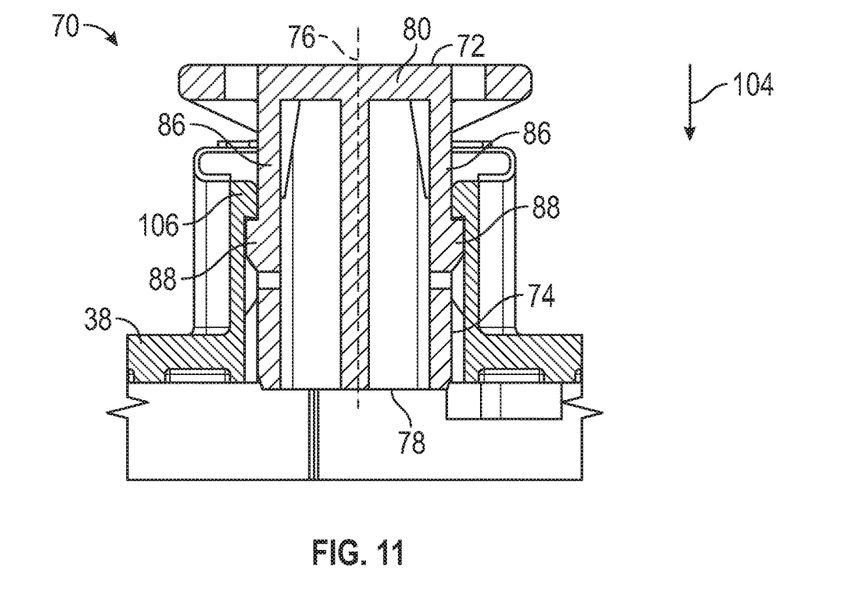
FIG. 11 is a cross-sectional view similar to FIG. 10 showing the connector position assurance button in a pre-lock position relative to the handle.

The lock surface 98 includes a release lock 106 located in the head groove 102 near the first handle side 96. The release lock 106 is a protrusion that extends from the lock surface 98 toward the slot axis 94. As the connector position assurance button 72 is moved into the connector position assurance slot 92, the lock head 88 engages the release lock 106. The lock head 88 and the release lock 106 included relatively sloped insertion surfaces 88a and 106a, respectively, which engage and cause the lock head 88 to deflect inwardly toward the slot axis 94. As previously described, the lock head 88 is attached to the lock arm 86, which is adapted to bend relative to the button body 74. When the connector position assurance button 72 has been moved in the assurance direction 104 so that the lock head 88 is moved past the release lock 106, the lock arm 86 will rebound and move the lock head 88 away from the slot axis 94. The connector position assurance button 72 is then located in a pre-lock position, which is illustrated in FIG. 11.

When the connector position assurance button 72 is located in the pre-lock position, the lock head 88 is adapted to engage the release lock 106 on the handle 38 to resist the connector position assurance button 72 from being moved opposite the assurance direction 104 relative to the handle 38. The lock head 88 includes a retaining surface 88b which is adapted to engage a retaining surface 106b on the release lock 106. The retaining surfaces 88b and 106b are sloped relative to each so that the lock head 88 remains engaged with the release lock 106 if the connector position assurance button 72 is moved from the pre-lock position opposite the assurance direction 104 relative to the handle 38. Thus, the connector position assurance button 72 is retained in the connector position assurance slot 92. This prevents the connector position assurance button 72 from being removed from the handle 38.

When the connector position assurance button 72 is in the pre-lock position, the lock head 88 is adapted to engage an assurance lock 108 on the handle 38 to resist the connector position assurance button 72 from being moved in the assurance direction 104 relative to the handle 38. The assurance lock 108 is a protrusion in the head groove 102 that is located between the release lock 106 and the second handle side 100. The assurance lock 108 extends from the lock surface 98 toward the slot axis 94. When the connector position assurance button 72 is in the pre-lock position, the insertion surface 88a on the lock head 88 engages a pre-lock surface 108a on the assurance lock 108 to resist the connector position assurance button 72 from being moved in the assurance direction 104 relative to the handle 38. This prevents the connector position assurance button 72 from being further inserted into the connector position assurance slot 92. Referring back to FIG. 9, the illustrated assurance lock 108 includes two protrusions located on either side of the head groove 102, with a lock gap 110 located therebetween. However, the assurance lock 108 may have any desired shape or configuration.

Referring back to FIG. 3, the connector position assurance button 72 is shown in the pre-lock position relative to the handle 38. As previously described, the handle 38 is attached to the plug housing 36 to make the plug assembly 28, shown in FIG. 2. The plug assembly 28 is mated with the base 26 and is initially moved to the primary circuit engaged position, corresponding to the lock tab 48 being in the position 48a indicated on FIG. 5.

Figure 12:
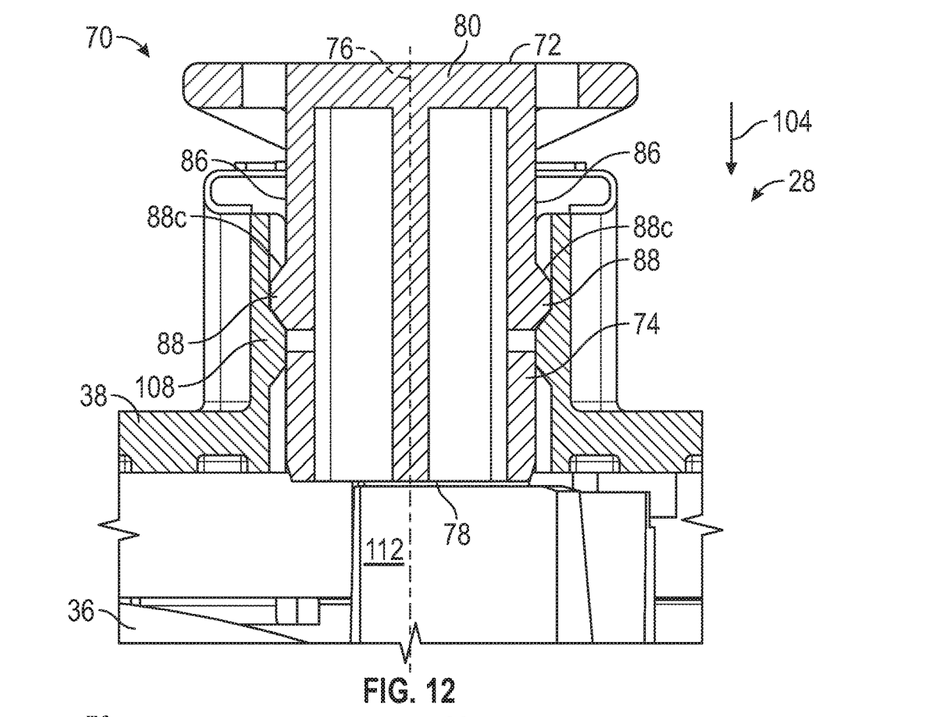
FIG. 12 is a cross-sectional view taken along a different section than that illustrated in FIG. 11 and showing the connector position assurance button in the pre lock position when the handle has been attached to the plug housing.

Referring to FIG. 12, a cross-sectional view of the connector position assurance assembly 70 is illustrated when the plug assembly 28 is located in the primary circuit engaged position. The cross-sectional view illustrated in FIG. 12 is taken along a different section than the view illustrated in FIGS. 10 and 11. FIGS. 10 and 11 are taken through the slot axis 94 and are taken through the lock gap 110. FIG. 12 is taken parallel to those views, but is taken through the pre-lock surface 108a on the assurance lock 108. The cross-section illustrated in FIG. 12 shows portions of the handle 38, the position assurance button 72, and the plug housing 36.

As best shown in FIG. 3, the plug assembly 28 includes a connector position assurance stop 112 that extends from a first housing side 114 of the plug housing 36. The first housing side 114 is the side of the plug housing 36 that faces the handle 38. The illustrated connector position assurance stop 112 is a raised wall that extends substantially perpendicular from first housing side 114. The illustrated connector position assurance stop 112 has an arcuate shape, with a radius centered on the rotation axis 40. However, the connector position assurance stop 112 may have any desired shape.

Referring back to FIG. 12, when the plug assembly 28 is in the primary circuit engaged position, the connector position assurance stop 112 is located in the assurance direction 104 of the button stop 90. Thus, if a force is applied to the press surface 84 to move the connector position assurance button 72 farther into the connector position assurance slot 92, the button stop 90 will engage the connector position assurance stop 112 and prevent movement of the connector position assurance button 72 relative to the plug housing 36. Thus, the connector position assurance button 72 will engage the connector position assurance stop 112 to restrict movement of the connector position assurance button 72 in the assurance direction 104 when the plug assembly 28 is in the primary circuit engaged position.

Figure 13:
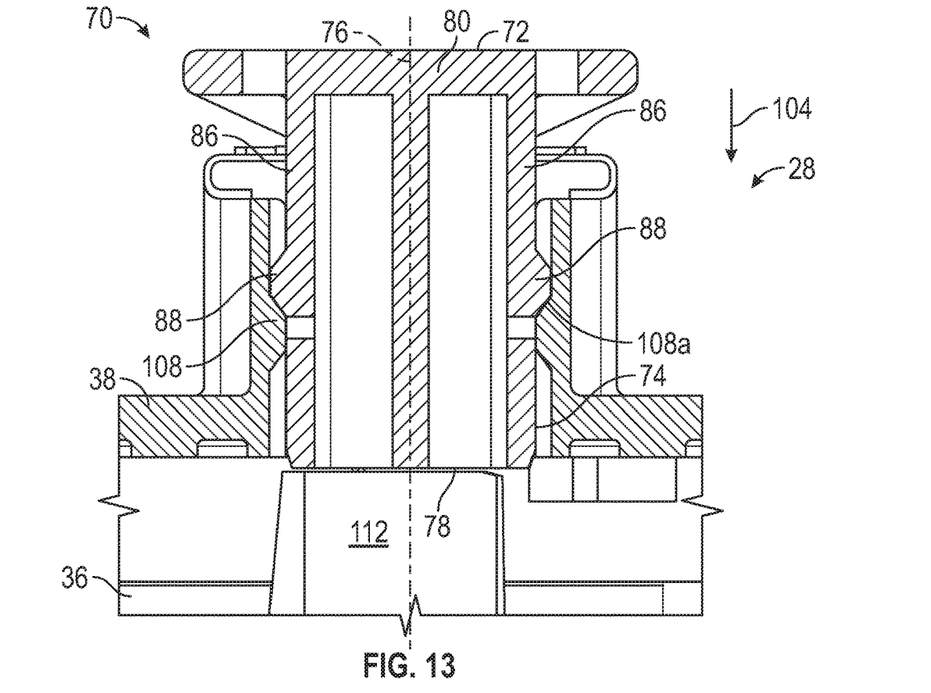
FIG. 13 is a cross-sectional view similar to FIG. 12 showing the connector position assurance button when the plug assembly is an intermediate position relative to the base.

As previously described, the plug assembly 28 is moved from the primary circuit engaged position to the intermediate position (indicated at 48b on FIG. 5) by rotating the handle 38 relative to the plug housing 36. This will also move the connector position assurance button 72 relative to the connector position assurance stop 112, as shown in FIG. 13. Referring back to FIG. 3, the connector position assurance stop 112 includes an angular length that is large enough so that when the plug assembly 28 is in the intermediate position, the connector position assurance stop 112 is located in the assurance direction 104 of the button stop 90. Thus, the connector position assurance stop 112 restricts movement of the connector position assurance button 72 in the assurance direction 104 when the plug assembly 28 is in the intermediate position.

The plug assembly 28 is moved from the intermediate position to the interlock position (indicated by 48c on FIG. 5) by moving the plug assembly 28 in the insertion direction 34 relative to the base 26. The plug housing 36 and the handle 38 move together and do not move relative to each other. The plug assembly 28 remains in the configuration shown in FIG. 13. Thus, the connector position assurance stop 112 restricts movement of the connector position assurance button 72 in the assurance direction 104 when the plug assembly 28 is located in the interlock position.

The plug assembly 28 is moved from the interlock position to the locked position (indicated by 48d on FIG. 5) by rotating the handle 38 relative to the plug housing 36. This also moves the connector position assurance button 72 relative to the connector position assurance stop 112 to the position shown in FIG. 14. When the plug assembly 28 is in the locked position, the connector position assurance stop 112 is not located in the assurance direction 104 of the button stop 90. Thus, the connector position assurance button 72 is adapted to be moved in the assurance direction 104 from the pre-lock position when the plug assembly 28 is located in the locked position.

As previously described, the assurance lock 108 engages the lock head 88 to prevent the connector position assurance button 72 being moved in the assurance direction 104 relative to the handle 38. In order to move the connector position assurance button 72, the operator may apply a force to the press surface 84 of the connector position assurance button 72.

Figure 15:
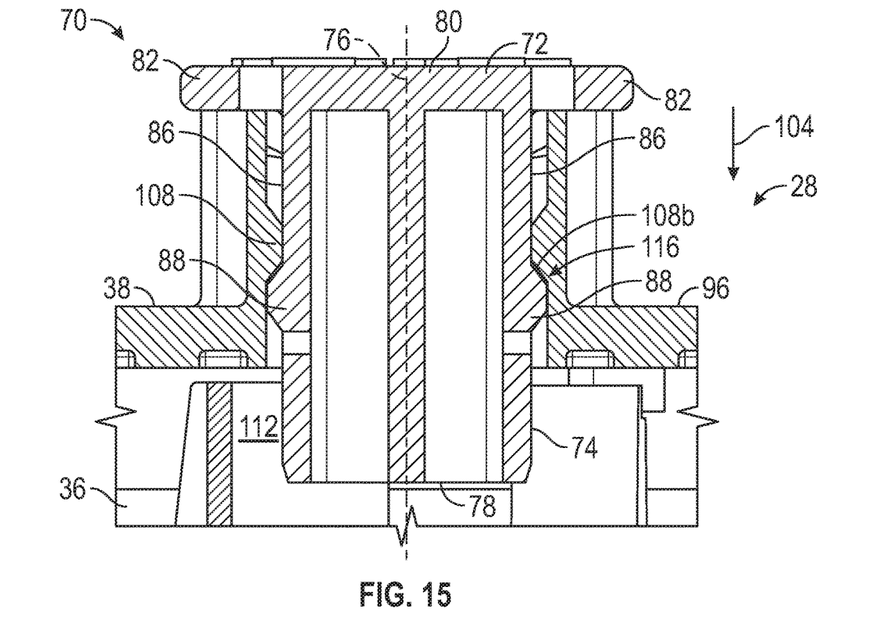
FIG. 15 is a cross-sectional view similar to FIG. 14 showing the connector position assurance in an assurance position relative to the handle and the plug housing.

As the connector position assurance button 72 is moved in the assurance direction 104 relative to the handle 38, the lock head 88 engages the assurance lock 108. The insertion surface 88a on the lock head 88 and the pre-lock surface 108a on the assurance lock 108 are relatively sloped and engage, causing and cause the lock head 88 to deflect inwardly toward the slot axis 94. As previously described, the lock head 88 is attached to the lock arm 86, which is adapted to bend relative to the button body 74. When the connector position assurance button 72 has been moved in the assurance direction 104 so that the lock head 88 is located past the assurance lock 108, the lock arm 86 will rebound and move the lock head 88 away from the slot axis 94. The connector position assurance button 72 is then located in an assurance position, which is illustrated in FIG. 15. In the illustrated embodiment, when the connector position assurance button 72 is located in the assurance position, the wings 82 engage the first handle side 96 to prevent movement of the connector position assurance button 72 farther in the assurance direction 104. However, the connector position assurance 70 may include any desired stop.

The connector position assurance assembly 70 includes a final lock, indicated generally at 116, that retains the connector position assurance button 72 in the assurance position. When the connector position assurance button 72 is located in the assurance position, the lock head 88 is adapted to engage the assurance lock 108 on the handle 38 to prevent the connector position assurance button 72 from being moved opposite the assurance direction 104 relative to the handle 38. When the connector position assurance button 72 is located in the assurance position, a lock surface 88c on the lock head 88 engages a final-lock surface 108b on the assurance lock 108 to prevent the connector position assurance button 72 from being moved opposite the assurance direction 104 relative to the handle 38. This prevents the connector position assurance button 72 from being moved out of the assurance position.

When the plug assembly 28 is in the locked position, both the primary circuit 18 closed and the interlock loop 22 are closed, and the connector position assurance assembly 70 allows the operator to confirm that the plug assembly 28 is in the locked position relative to the base 26. Additionally, the connector position assurance assembly 70 acts as a lock to retain the plug assembly 28 in the locked position.

Referring back to FIG. 5, when the plug assembly 28 in the locked position, the lock tab 48 is in the position 48d in the lock channel 50. In order to remove the plug assembly 28 from the base 26, the handle 38 is rotated opposite the locking direction 5k and the lock tab 48 is moved to the position 48c. However, the connector position assurance assembly 70 prevents the handle 38 from being rotated relative to the base 26 out of the locked position when the connector position assurance button 72 is in the assurance position. If the operator attempts to rotate the handle 38 when the plug assembly 28 is in the locked position, the connector position assurance button 72 engages the connector position assurance stop 112 to prevent the handle 38 from moving. Specifically, the button stop 90 on the connector position assurance stop 112 engages the position assurance stop 112 to prevent the handle 38 from moving. As shown in FIG. 15, the connector position assurance button 72 is positioned so that the connector position assurance stop 112 is located opposite the locking direction 56 of the button stop 90. Thus, the connector position assurance button 72 is adapted to engage the connector position assurance stop 112 to prevent the handle 38 from moving opposite the locking direction 56 when the connector position assurance assembly 70 is in the locked position.

Figure 14:
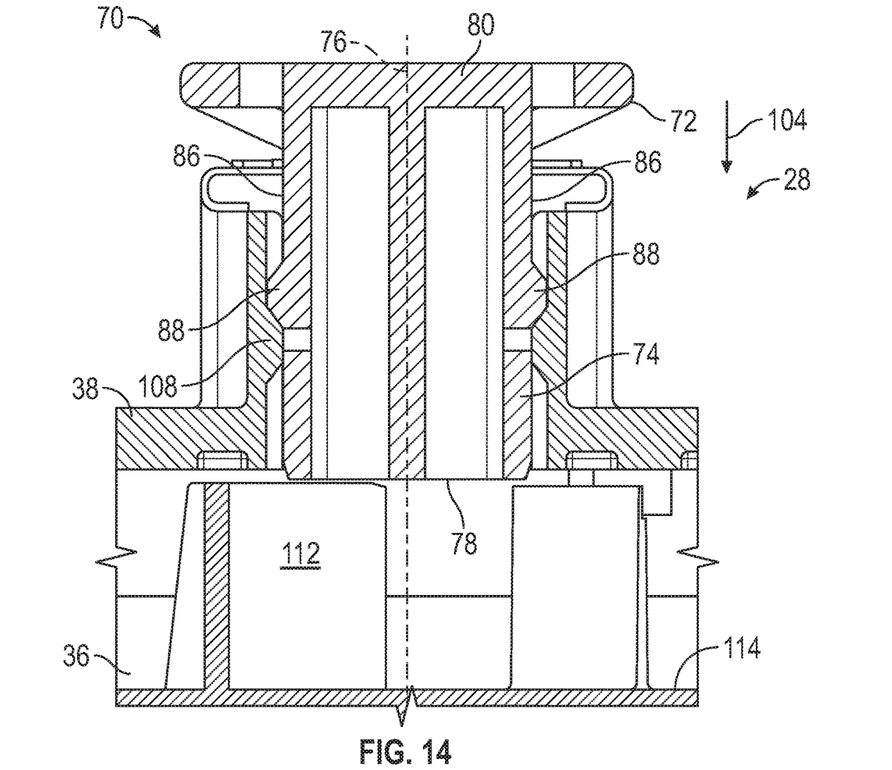
FIG. 14 is a cross-sectional view similar to FIG. 13 showing the connector position assurance button when the plug assembly is in a locked position relative to the base.

In order to disconnect the plug assembly 28 from the base 26, the operator can grasp the wings 82 and apply a force to move the connector position assurance button 72 from the assurance position, opposite the assurance direction 104, to the pre-lock position. As the connector position assurance button 72 is moved opposite the assurance direction 104 relative to the handle 38 from the assurance position, the lock head 88 engages the assurance lock 108. The lock surfaces 88c on the lock head 88 and the final-lock surface 108b on the assurance lock 108 are relatively sloped and engage, causing the lock head 88 to deflect inwardly toward the slot axis 94. As previously described, the lock head 88 is attached to the lock arm 86, which is adapted to bend relative to the button body 74. When the connector position assurance button 72 has been moved opposite the assurance direction 104 so that the lock head 88 is located past the assurance lock 108, the lock arm 86 will rebound and move the lock head 88 away from the slot axis 94. The connector position assurance button 72 is then located in the pre-lock position (which is illustrated in FIG. 14), and the plug assembly 28 may be removed from the base 26 by reversing the previously described process used to put the plug assembly 28 in the locked position.

As previously described and shown in FIG. 9, the assurance lock 108 is divided into two parts by the lock gap 110. As shown in FIG. 6, the illustrated lock surface 88c on the lock head 88 includes two lock surfaces 88c that are separated by the retaining surface 88b. The retaining surface 88b and the lock surface 88c are both located on the same side of the lock head 88. The retaining surface 88b and the lock surface 88c are both located on the side of the lock head 88 facing away from the insertion direction 34. When the connector assurance button 72 is moved from the assurance position opposite the assurance direction 104, each of the lock surfaces 88c will engage one of the parts of the assurance lock 108, and the lock surface 88c will be at least partially located in the lock gap 110.

As shown in FIG. 6, and also by comparing FIGS. 11 and 12, the retaining surface 88b and the lock surface 88c are sloped relative to the button axis 76 in different directions. The retaining surface 88b slopes from the lock arm 86 in the direction opposite the insertion direction 34, while the lock surface 88c slopes from the lock arm 86 in the direction of the insertion direction 34. This allows the retaining surface 88b and the lock surface 88c to provide different amounts of resistance to movement of the connector position assurance button 72 opposite the assurance direction 104 relative to the handle 38. The retaining surface 88b engages the retaining surface 106b on the release lock 106 to provide a greater amount of resistance than when the lock surface 88c engages the final lock surface 108b on the assurance lock 108. However, the retaining surface 88b and the lock surface 88c may have any desired relative orientations.

Referring back to FIG. 2, it is possible for the operator to rotate the handle 38 relative to the plug housing 36 before inserting the plug assembly 28 into the base 26. In normal use, the operator will put the connector position assurance button 72 in the pre-lock position and rotate the handle 38 relative to the plug housing 36 to place the plug assembly 28 in the initial position, illustrated in FIG. 2. As previously described, the plug assembly 28 can then be inserted into the base 26 so that the fuse terminals 44 mate with the primary terminals 46 and so that the lock tabs 48 enter the lock channels 50. Even when the plug assembly 28 is not inserted into the base 26, when the plug assembly 28 is in the initial position the connector position assurance stop 112 prevents the connector position assurance button 72 from being moved to the locked position. However, the operator may rotate the handle 38 relative to the plug housing 36 before inserting the plug assembly 28 into the base 26. The operator may then move the connector position button 72 to the assurance position. If the plug assembly 28 is not in the initial position with the handle 38 properly oriented relative to the plug housing 36, then the plug assembly 28 cannot be mated with the base 26 because the plug assembly 28 cannot be positioned so that the fuse terminals 44 engage the primary terminals 46 and the lock tabs 48 enter the lock channels 50.

Although the connector position assurance assembly 70 has been described as part of the illustrated manual disconnect 20 and the illustrated plug assembly 28, the connector position assurance assembly 70 may be used with any desired manual disconnect and any desired plug assembly. Additionally, the plug assembly 28 in the illustrated manual disconnect 20 is moved relative to the base 26 through multiple discreet steps, illustrated and previously-described in reference to FIG. 5. However, the connector position assurance assembly 70 may be used with a plug assembly that is moved in any manner between the initial position and the locked position.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A manual disconnect for an electric circuit comprising:
   a base including primary terminals and an interlock connector;
   a plug assembly including fuse terminals and an interlock resistor assembly, the plug assembly adapted to be moved relative to the base between a disconnected position, wherein the fuse terminals are not engaged with respective primary terminals, a primary circuit engaged position, wherein the fuse terminals are engaged with respective primary terminals, and an interlock position, wherein the interlock connector is engaged with the interlock resistor assembly; and
   a connector position assurance assembly including a connector position assurance button movable relative to the plug assembly between a pre-lock position and an assurance position, wherein the connector position assurance assembly prevents the plug assembly from rotating relative to the base;
   wherein the plug assembly is adapted to be moved in an insertion direction relative to the base to move the plug assembly from the disconnected position to the primary circuit engaged position, and the plug assembly is adapted to be rotated about an axis relative to the base to move the plug assembly from the primary circuit engaged position to the interlock position.

2. The manual disconnect for an electric circuit of claim 1, wherein the plug assembling includes a handle and a plug housing, and wherein the handle is attached to the plug housing for relative rotation about the axis.

3. The manual disconnect for an electric circuit of claim 2, wherein the connector position assurance button is attached to the handle for relative linear movement.

4. The manual disconnect for an electric circuit of claim 3, wherein the connector position assurance button is movable relative to the handle in an assurance direction that is parallel to the insertion direction.

5. The manual disconnect for an electric circuit of claim 3, wherein the connector position assurance button is adapted to engage a connector position assurance stop on the plug housing to block movement of the connector position assurance button to the locked position when the plug assembly is located in the primary circuit engaged position.

6. The manual disconnect for an electric circuit of claim 5, wherein the connector position assurance button is adapted to engage the connector position assurance stop to block movement of the connector position assurance button to the locked position when the plug assembly is located in the interlock position.

7. The manual disconnect for an electric circuit of claim 6, wherein the connector position assurance button is adapted to engage the connector position assurance stop to block rotation of the handle relative to the plug housing when the connector position assurance assembly is located in the assurance position.

8. The manual disconnect for an electric circuit of claim 5, wherein the connector position assurance button is adapted to engage the connector position assurance stop to block rotation of the handle relative to the plug housing when the connector position assurance assembly is located in the assurance position.

9. The manual disconnect for an electric circuit of claim 1, wherein the connector position assurance button is movable relative to the plug assembly in an assurance direction that is parallel to the insertion direction.

10. The manual disconnect for an electric circuit of claim 9, further including a connector position assurance stop that is located in the assurance direction of the connector position assurance button when the plug assembly is located in the primary circuit engaged position.

11. The manual disconnect for an electric circuit of claim 10, wherein the connector position assurance stop is located in the assurance direction of the connector position assurance button when the plug assembly is located in the interlock position.

12. The manual disconnect for an electric circuit of claim 11, wherein the connector position assurance button is adapted to engage the connector position assurance stop to block rotation of the handle relative to the plug housing when the connector position assurance assembly is located in the assurance position.

13. A manual disconnect for an electric circuit comprising:
   a base including primary terminals and an interlock connector;
   a plug assembly including a plug housing with fuse terminals, an interlock resistor assembly, and a handle attached to the plug housing for relative rotational movement, the plug assembly adapted to be moved relative to the base between a disconnected position, wherein the fuse terminals are not engaged with respective primary terminals, a primary circuit engaged position, wherein the fuse terminals are engaged with respective primary terminals, and an interlock position, wherein the interlock connector is engaged with the interlock resistor assembly; and
   a connector position assurance assembly including a connector position assurance button movable relative to the handle between a pre-lock position and an assurance position wherein the connector position assurance assembly prevents the handle from rotating relative to the base
   wherein the plug assembly is adapted to be moved in an insertion direction relative to the base to move the plug assembly from the disconnected position to the primary circuit engaged position, and wherein the handle is adapted to be rotated about an axis parallel to the insertion direction relative to the base to move the plug assembly from the primary circuit engaged position to the interlock position.

14. The manual disconnect for an electric circuit of claim 13, wherein the connector position assurance button is movable relative to the handle in an assurance direction that is parallel to the insertion direction.

15. The manual disconnect for an electric circuit of claim 14, wherein the connector position assurance button is adapted to engage a connector position assurance stop on the plug housing to block movement of the connector position assurance button to the locked position when the plug assembly is located in the primary circuit engaged position.

16. The manual disconnect for an electric circuit of claim 15, wherein the connector position assurance button is adapted to engage the connector position assurance stop to block rotation of the handle relative to the plug housing when the connector position assurance assembly is located in the assurance position.

17. The manual disconnect for an electric circuit of claim 16, wherein the handle is adapted to rotate about the axis relative to the base to move the plug assembly to a locked position, wherein connector position assurance stop cannot prevent movement of the connector position assurance button.

18. The manual disconnect for an electric circuit of claim 17, wherein the connector position assurance button is adapted to engage the connector position assurance stop to block rotation of the handle relative to the base when the connector position assurance assembly is located in the assurance position.

19. A manual disconnect for an electric circuit comprising:

a plug assembly including a plug housing with fuse terminals and an interlock resistor assembly, and a handle attached to the plug housing for relative rotational movement between an initial position and a locked position, the plug assembly including a connector position assurance button attached to the handle for relative movement between a pre-lock position in an assurance direction to an assurance position, wherein the connector position assurance button engages the plug housing to prevent movement to the assurance position when the handle is in the initial position.

20. The manual disconnect for an electric circuit of claim 19, wherein the connector position assurance button engages the plug housing to prevent movement of the handle relative to the plug housing when the handle is in the locked position and the connector position assurance button is in the assurance position.

* * * * *